Jan. 6, 1931.  R. S. JACOBSEN  1,788,108
CHANGE SPEED TRANSMISSION
Filed Nov. 9, 1928  3 Sheets-Sheet 1

Inventor:
Richard S. Jacobsen
By
Arthur F. Durand
Atty.

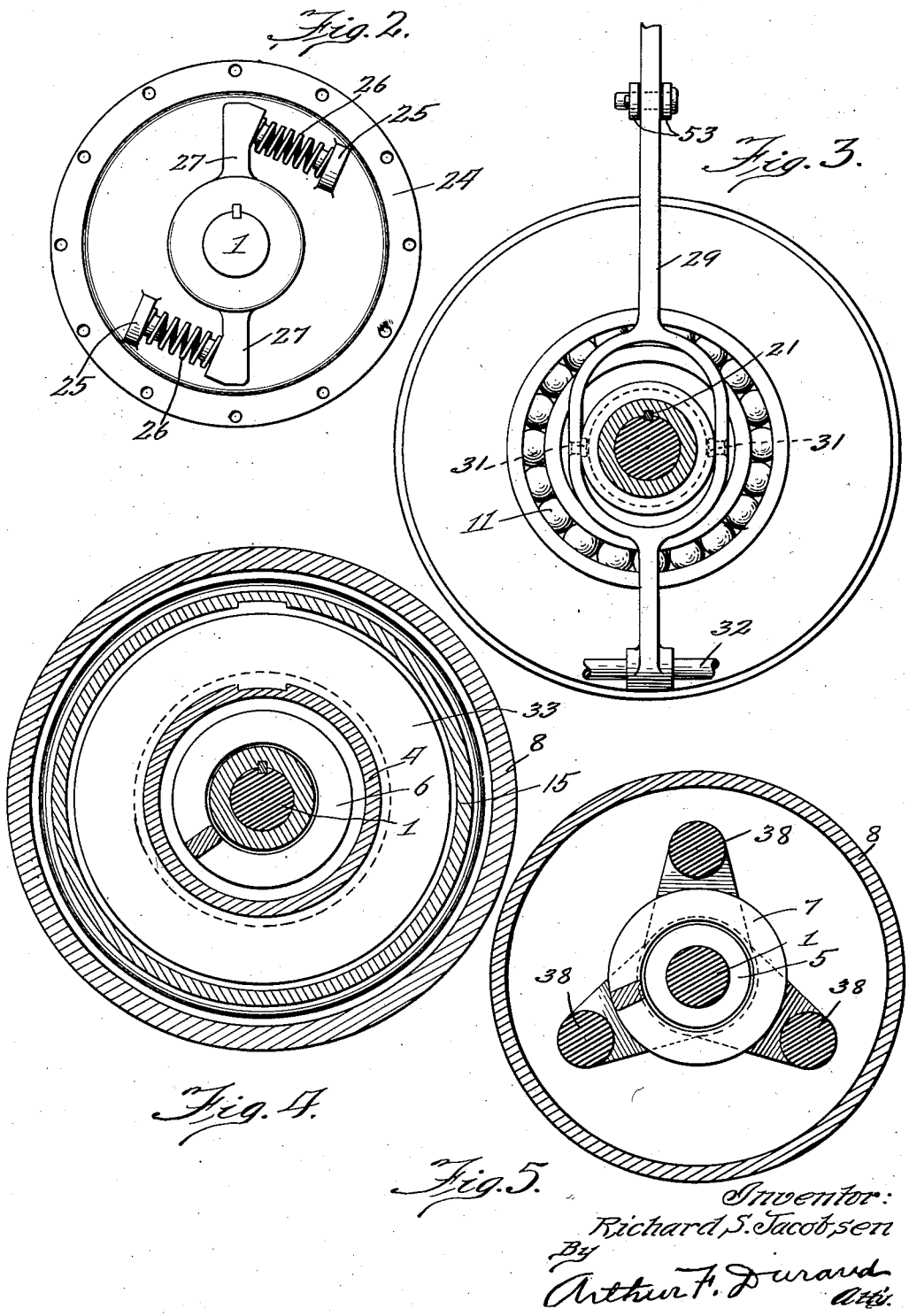

Jan. 6, 1931.   R. S. JACOBSEN   1,788,108
CHANGE SPEED TRANSMISSION
Filed Nov. 9, 1928   3 Sheets-Sheet 3

Inventor:
Richard S. Jacobsen
By Arthur F. Durand
Atty

Patented Jan. 6, 1931

1,788,108

UNITED STATES PATENT OFFICE

RICHARD S. JACOBSEN, OF WHEATON, ILLINOIS, ASSIGNOR TO J. F. S. COMPANY, OF CHICAGO, ILLINOIS, A CORPORATION OF ILLINOIS

CHANGE-SPEED TRANSMISSION

Application filed November 9, 1928. Serial No. 318,131.

This invention relates to change speed transmission of that kind in which a plurality of rolling friction members are arranged in raceways, at least one of said raceways being directly controllable for varying the contact of said members on said raceways, thereby to vary the speed of transmission as between the input shaft and the output shaft, for any suitable or desired purpose.

Generally stated, the object of the invention is to provide a novel and improved construction and arrangement whereby a variable load imposed on the output shaft will serve automatically to change the speed of transmission accordingly, whereby manual control of the transmission, although possible for some purposes, is not necessary for the varying of the ratio of transmission from the input shaft to the output shaft, in order to take care of a variable load.

Another object is to provide an improved construction and arrangement for reversing the direction of transmission from the input shaft to the output shaft.

It is also an object to provide certain details and features of construction and combinations tending to increase the general efficiency and the desirability of a change speed transmission of this particular character.

To these and other useful ends, the invention consists in the matters hereinafter set forth and claimed, and shown in the accompanying drawings, in which,—

Fig. 2 is a transverse section, on a larger scale, on line 2—2 in Fig. 1.

Fig. 3 is a similar section on line 3—3 in Fig. 1.

Fig. 4 is a similar section on line 4—4 in Fig. 1.

Fig. 5 is a similar section on line 5—5 in Fig. 1.

Figure 1:
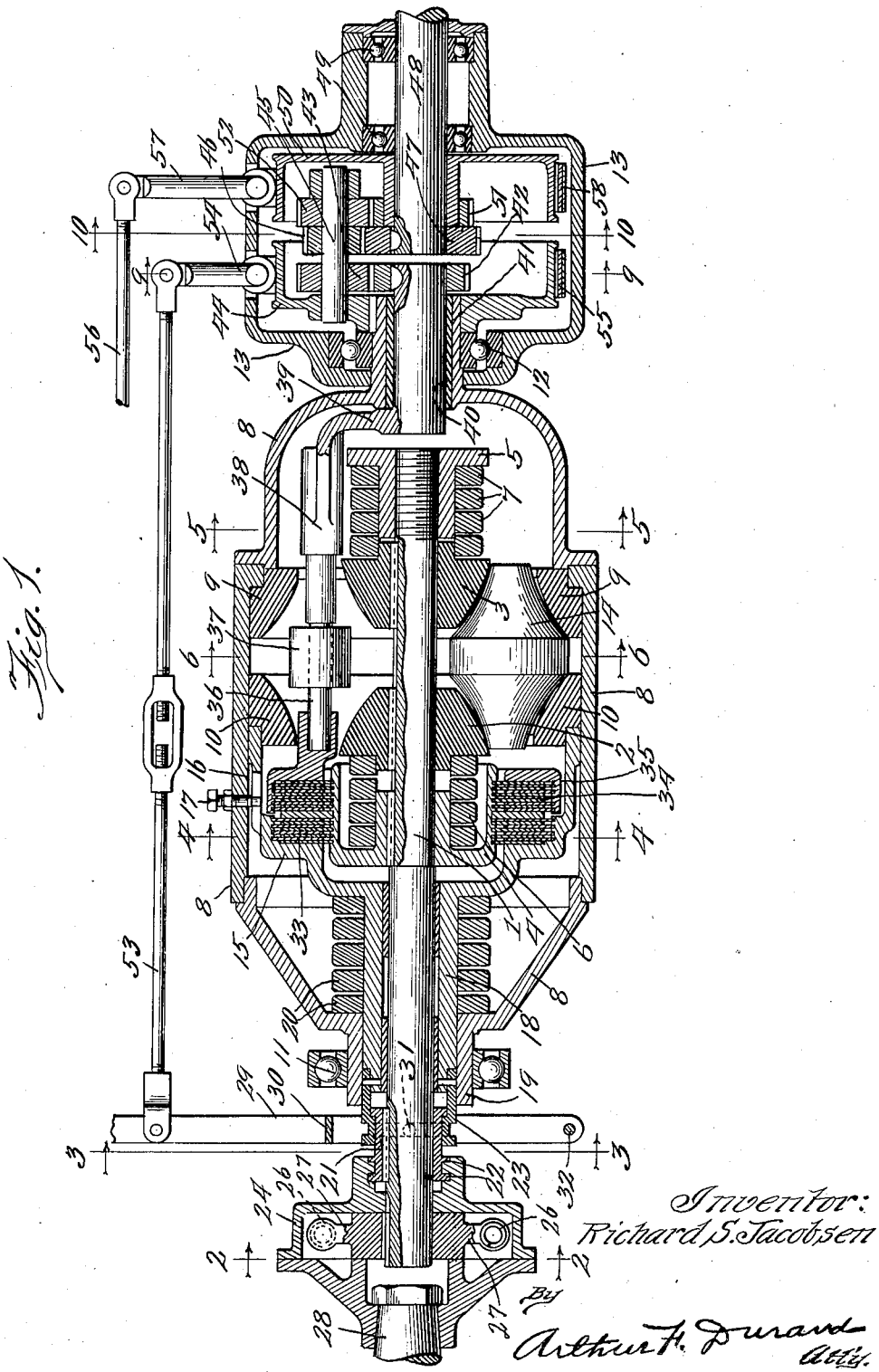
Fig. 1 is a longitudinal section of a change speed transmission embodying the principles of the invention.
Figure 6:
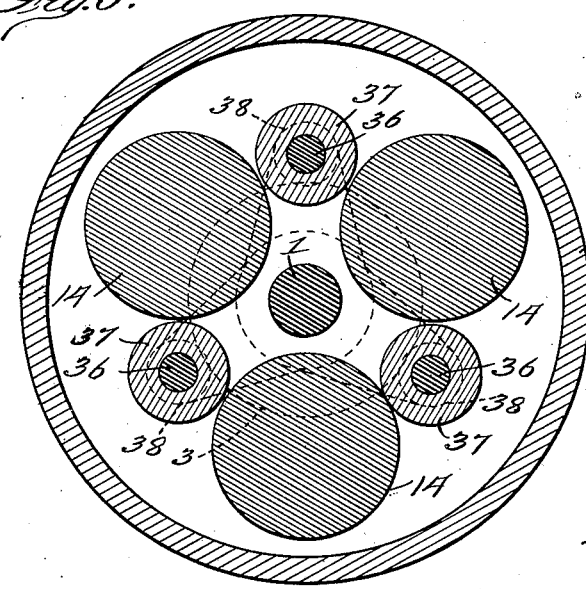
Fig. 6 is a similar section on line 6—6 in Fig. 1.
Figure 7:
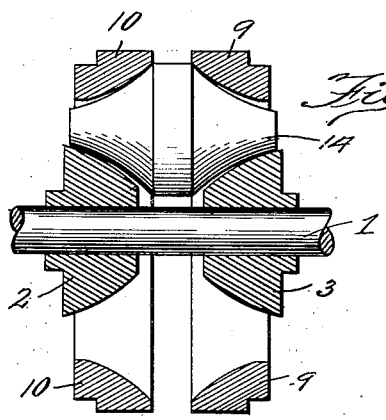
Figs. 7 and 8 are diagrammatic views showing different positions of the rolling members and raceways.

As thus illustrated, the input shaft 1 is provided with a couple of splined inner raceways 2 and 3, and with a splined clutch member 4 and a shoulder piece 5 secured thereon. A coiled spring 6 is interposed between the clutch member 4 and the raceway 2, while a similar spring 7 is interposed between the shoulder piece 5 and the raceway 3, in the manner shown. The outer casing 8 is provided with a fixed outer raceway 9, opposite the inner raceway 3, and with a splined or sliding raceway 10 opposite the previously mentioned inner raceway 2, as shown. The casing 8 is provided at one end with a ball bearing 11, in which it is supported at this end, and at its other end the casing is supported by a ball bearing 12 supported in a stationary casing 13, the purpose of which latter will hereinafter more fully appear. The rolling members 14 are substantially frusto-conical at each end, or double conical, with each conical surface substantially concave, as shown. The raceways 2, 3, 9 and 10 have bearing surfaces, it will be seen, which are substantially convex, when these raceways are viewed in longitudinal section, thereby insuring substantial contact between the rolling members and the raceways. The raceway 10 is, as stated, splined on the casing 8 through the medium of a raceway carrier member 15, which has one or more grooves 16 engaging a set screw 17 inserted through the housing or casing 8, whereby the latter and the member 15 have relative axial adjustment or displacement, but are held against relative rotation. The member 15 has a sleeve-like end portion 18 mounted to slide endwise on the shaft 1, in the end portion 19 of the housing 8, and a coiled spring 20 is interposed between opposing shoulders on the housing 8 and the member 15, as shown, whereby the normal and relative positions of the rolling members 14 and the different raceways are as shown in Fig. 1 of the drawings, and as shown in the diagram, Fig. 7 of the drawings. A sleeve 21 having screw threads 22 is keyed on the shaft 1, and a yoke sleeve 23 is keyed to the sleeve 18 and mounted loosely on the sleeve 21, as shown in Fig. 1 of the drawings. A housing 24 has screw engagement with the screw threads 22, and is provided internally with lugs 25 to provide shoulders for the compression coiled springs 26 enclosed in the housing. The arms 27 are keyed on the shaft 1, as shown in Figs. 1 and 2 of the drawings, and the said springs 26 are interposed between the shoulders 25 and the arms 27, whereby a yielding connection is provided between the shaft 1 and the shaft 28, which latter is rigid with the housing 24 previously mentioned. Also, at this end of the mechanism, a lever 29 having a yoke 30 is provided with pins or rollers 31 for engaging the groove of the yoke member 23 previously mentioned, this lever being pivoted at 32, at its lower end.

Figure 9:
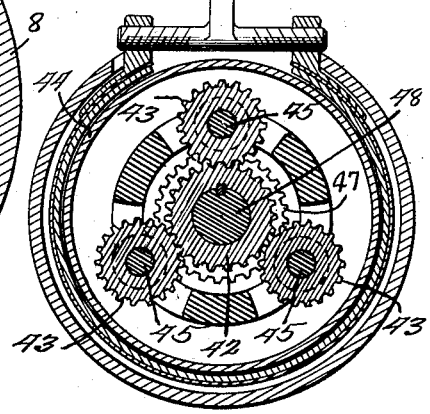
Fig. 9 is a transverse section on line 9—9 in Fig. 1.

There is a friction plate clutch connection 33 between the member 4 and the member 15, and there is a similar friction plate clutch 34 between the member 4 and the ring member 35, which latter is provided with spindles 36 having rollers 37 interposed between the members 14 previously mentioned. These spindles 36 are continued on to engagement with the legs 38 of the spider member 39, which latter is rigid with the shaft 40 mounted to turn in the sleeve-like end portion 41 of the housing 8 previously mentioned. The output shaft 40 has a pinion 42 keyed to its end portion, which pinion engages the planetary or idler gears 43, as shown in Figs. 1 and 9 of the drawings. A brake drum 44 is keyed on the sleeve portion 41, and rods or spindles 45 are mounted in the brake drum 44, as shown. Gears 46 are mounted on the rotary spindles or short shafts 45 to engage the pinion 47 on the shaft 48, which latter is an output shaft also and is supported in ball bearings 49 within the housing 13 previously mentioned. Another brake drum 50 is mounted loosely on the shaft 48 and is provided with a pinion 51 engaging the planetary gears or idlers 52 on the spindles 45 previously mentioned. The gears 43, 46 and 52 are all rigid with the spindles 45, obviously, to operate in the manner hereinafter set forth.

A rod 53 is provided for connecting the lever 29 with the lever mechanism 54, of any suitable character, for contracting and releasing the brake band 55 on the drum 44 previously mentioned. Similarly, a rod 56 can be provided for operating the lever mechanism 57, of any suitable character, for controlling the brake band 58 of the drum 50 previously mentioned. The lever 29 can be a foot pedal, or a hand lever, as occasion may require, and the rod 56 can be operated by a foot pedal or hand lever, as occasion may require.

With the foregoing construction, it is obvious that power can be applied to the shaft 28, and from the latter to the shaft 1; this shaft in such case being the input shaft; and when this is done, power will be transmitted from the mechanism through the shaft 48, this shaft then being the output shaft. With the entire mechanism in normal condition, power applied to the shaft 28 will rotate the shaft 48 at the same speed, inasmuch as the two clutch connections 33 and 34 are normally closed, and held closed by the spring 20, thus causing the housing 8 to rotate, and this causing the housing 8 and the shaft 40 to rotate in unison, whereby the gears 43, 46, 52, 42 and 47 are locked, so to speak, causing the shaft 48 to rotate in the same direction and at the same speed as the input shaft.

Figure 8:
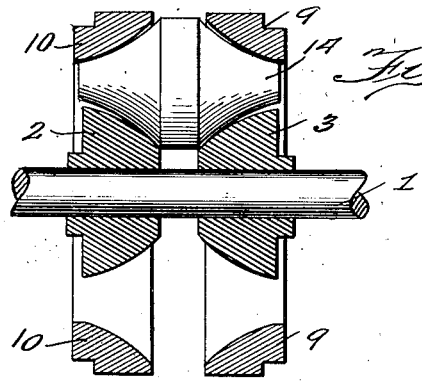
Figure 10:
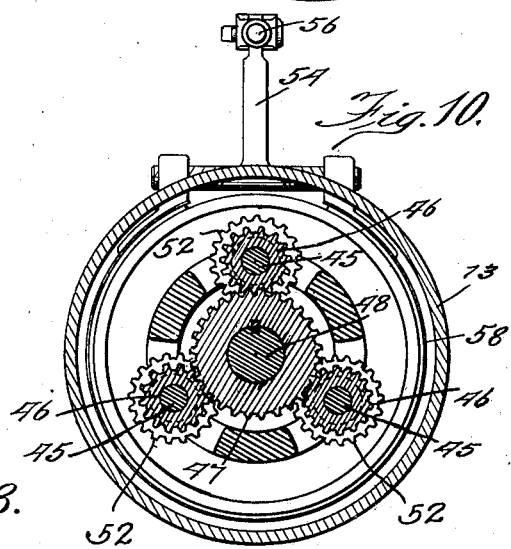
Fig. 10 is a similar section on line 10—10 in Fig. 1.

However, assuming that the load on the output shaft 48 is increased, to the extent that the springs 26 will be partially compressed, it will be seen that the consequent screw action at the threads 22 will cause endwise displacement of the sleeve-like portion 18, with the result that the clutch connections 33 and 34 will be opened, and with the result that the raceways and rolling members 14 will assume, for example, the relative positions shown in Fig. 8 of the drawings. At the same time, the brake band 55 having been clamped or set by the consequent movement of the lever 29, it follows that the casing 8 will be held against rotation while the shaft 40 will be free to rotate at a slower speed; and, under such circumstances, the transmission will be from the shaft 40 through the pinion 42 and the gears 43 and the shafts 45 and the gears 46 to the pinion 47, with the result that the shaft 48 will rotate at some slower speed than the input shaft, under these circumstances. Thus the ratio of transmission is automatically changed in response to a variable load on the output shaft, whereby the ratio is automatically increased for an increased load, and automatically reduced for a lighter load; and, for high speed, as when a motor vehicle or other machine is running freely after having attained the desired speed, the input shaft and the output shaft will rotate at the same speed.

To reverse the output shaft, the brake band 58 is clamped or set on the drum 50, after opening clutch 33, 34 and releasing brake band 55, causing the shaft 40 to remain stationary and causing the shaft 48 to thereby rotate in the opposite direction, instead of in the other direction as formerly.

Thus, when transmitting at high speed, the transmission is from the input shaft 28 through the casing 8 and to the planetary gearing in locked condition to the output shaft 48, as previously explained; but for low speed transmission, as when a heavier load is imposed on the output shaft 48, the transmission is then from the input shaft 28 to the shaft 1, through the raceways 2 and 3, to the rolling members 14, from the latter to the spider 39, the members 14 in this case rolling around on the raceways 9 and 10, while the latter are held against rotation. The same automatic speed control or adjustment, it will be seen, to automatically take care of a varying load, by a variable ratio, is true of the mechanism regardless of whether the output shaft 48 is rotating in one direction or the other, except that for the reverse the maximum speed is not used.

Thus it will be seen that the casing 8 is held against rotation for the heavier loads and lower output speeds, but is permitted to rotate for the lighter loads and greater output speeds. Assume, for example, that the shaft 28 is driven by the engine of a motor vehicle. In such case, the clutch mechanism 33 and 34 would remain closed, and the casing 8 would rotate, for the higher output speeds, but the clutch mechanism would be open and the casing would not rotate for the heavier loads and lower output speeds, this variable ratio between the input and output shafts or ends of the transmission being automatically controlled by the action of the springs 26 and the screw threads 22 and the other elements constituting the automatic control devices in the input end of the transmission. In other words, and while the reversing mechanism is in the output end portion of the transmission, the automatic speed control devices are in the input end portion of the transmission, in the construction shown and described, which construction is illustrative of one form of the invention, but the invention is not limited to the exact construction or arrangement shown and described.

What I claim as my invention is:

1. A change speed power transmission having power transmitting instrumentalities including rolling members and raceways therefor adjustable to vary the ratio of speed between the input and output thereof, said members rotating about individual axes always parallel while revolving about the longitudinal axis of said transmission, power offtake means revolving about said longitudinal axis in unison with said members, output means driven by said offtake means, in combination with automatic adjusting devices for automatically changing said ratio while said axes remain parallel with the axis of said offtake means and operative automatically by and responsive to a change or variation of the load on the output.

2. A structure as specified in claim 1, said devices comprising a yielding spring connection having a yielding torque coupling in the input of said transmission.

3. A structure as specified in claim 1, an outer one of said raceways being non-rotary for low speeds and means whereby this raceway is directly controllable by the automatic operation of said devices.

4. A structure as specified in claim 1, said instrumentalities comprising two outer raceways and two inner raceways, with said rolling members between the outer raceways and the inner raceways, the inner raceways being movable toward and away from each other, for low speeds one of said outer raceways being held against rotation and axial displacement, and for low speeds the other outer raceway being non-rotary but movable axially and automatically by the automatic operation of said devices.

5. A structure as specified in claim 1, said devices comprising a yielding spring connection having a yieldable torque coupling in the input portion of said transmission, comprising one or more compression coiled springs adapted to yield and thereby cause automatic operation of said devices when the load is increased on the output.

6. A structure as specified in claim 1, said devices comprising a yielding spring connection having a yieldable torque coupling in the line of transmission, and comprising a screw connection operative automatically by the yielding of said spring connection when the load is increased on the output.

7. A structure as specified in claim 1, comprising a rotatable casing for said transmission, said devices being disposed in the input end portion of said transmission, exercising automatic raceway control over said members in combination with mechanism outside of said casing and in the output end portion for reversing the direction of motion of the output.

8. A structure as specified in claim 1, comprising a rotatable casing for said transmission in combination with mechanism for reversing the direction of motion of the output, subject to change of speed therein by said devices in response to a variable load thereon, and a fixed rotating casing for said mechanism.

9. A structure as specified in claim 1, said instrumentalities comprising an outer casing, and comprising clutch mechanism for causing said members and raceways and casing to rotate in unison for the minimum load and maximum output speed, and comprising means automatically operative by said devices to hold said casing and two outer raceways against rotation to provide a variable ratio of transmission for heavier loads.

10. A structure as specified in claim 1, comprising clutch mechanism automatically operative by said devices, and devices whereby said clutch mechanism is normally closed for the minimum load and maximum output speed, but is open to provide a variable ratio of transmission for heavier loads.

11. A structure as specified in claim 1, said instrumentalities comprising inner raceways yieldingly pressed toward each other by coiled springs, and comprising outer raceways, with said rolling friction members between said outer raceways and said inner raceways, said inner raceways being rotatable by the input, in combination with means for holding the outer raceways against rotation for the heavier loads and lower speeds, but permitting rotation of said outer raceways for the higher speeds and lighter loads.

12. A structure as specified in claim 1, said instrumentalities including an outer casing or housing, in combination with means including devices automatically operative by said devices to hold said casing against rotation for the heavier loads and lower output speeds and permitting rotation of said casing or housing for the lighter loads and higher output speeds.

13. A structure as specified in claim 1, said instrumentalities including clutch mechanism and means including devices whereby said mechanism is automatically operative by said devices, and normally closed for the lighter loads and higher output speeds and automatically opened by said devices for the heavier loads and lower output speeds.

14. A change speed power transmission having an outer casing formed at opposite ends with tubular end portions, an axial input shaft supported in one end portion of said casing, an axial output shaft supported in the other end portion of said casing, bearings in which said tubular portions are supported for rotation of the casing, a variable speed power transmission mechanism connecting one shaft to the other inside of said casing and having adjustable means providing a variable speed ratio transmission for different loads on said output shaft, means operative on one of said tubular end portions whereby said casing is held against rotation for said variable speed of transmission, and means for causing rotation of said casing and output shaft in unison with said input shaft for a minimum or lighter load on said output shaft.

15. A structure as specified in claim 14, said mechanism comprising inner and outer raceways with rolling friction members between said raceways, with means connecting said members to said output shaft, said inner raceways being rotatable in unison with said input shaft, and said outer raceways being held against rotation relatively to said casing, whereby said rolling members revolve about the longitudinal axis of said transmission while rotating about their individual axes, when said casing is held against rotation.

16. A structure as specified in claim 14, comprising means on said input shaft connected to automatically control said mechanism and govern said variable speed of transmission, responsive to a variable load on said output shaft.

17. A structure as specified in claim 14, comprising means on said input shaft connected to automatically control said mechanism and govern said variable speed of transmission and responsive to a variable load on said output shaft and having provisions to automatically release said casing and cause said rotation thereof and consequently higher speed transmission in response to a lighter load on said output shaft.

18. A structure as specified in claim 14, comprising a reversing gear power transmission connection for said output shaft, supported on one of said tubular end portions.

19. A structure as specified in claim 14, said mechanism comprising inner and outer raceways, with free rolling members between said raceways, and comprising connecting means interposed between said members to cause the output shaft to be rotated by said members.

20. A structure as specified in claim 14, said mechanism comprising inner and outer raceways, with rolling members interposed between said raceways, one outer raceway being rigid with said casing, and the other outer raceway being axially adjustable on the casing to vary the four point raceway contact on said members, said adjustable raceway and said casing being held against rotation relatively to each other, and said inner raceways being on said input shaft whereby all four raceways rotate in unison when said casing is rotated including means connecting said members to said output shaft.

21. A structure as specified in claim 14, said means for causing rotation of said casing comprising a clutch in said casing, forming a connection between the casing and the input shaft, and including an automatic torque device disposed on said input shaft to automatically operate said clutch.

22. A structure as specified in claim 14, said means for causing rotation of said casing comprising a clutch in said casing, forming a connection between the casing and the input shaft, and including an automatic torque device disposed on said input shaft and having means to automatically operate said clutch, comprising a compression spring for closing said clutch, said torque device being operable by an increased load on said output shaft to open said clutch.

23. A structure as specified in claim 14, including an automatic torque device on said input shaft having means to automatically control said mechanism responsive to a variable load on said output shaft.

RICHARD S. JACOBSEN.